Oct. 5, 1965    I. ERLICHMAN    3,209,885
COIN RECEIVING AND RECORDING RECEPTACLE
Filed Feb. 12 1964    7 Sheets-Sheet 1

INVENTOR.
Irving Erlichman
BY Morse & Altman
ATTORNEYS

Oct. 5, 1965    I. ERLICHMAN    3,209,885
COIN RECEIVING AND RECORDING RECEPTACLE
Filed Feb. 12 1964    7 Sheets-Sheet 2

FIG. 2

INVENTOR.
Irving Erlichman
BY Morse & Altman
ATTORNEYS

INVENTOR.
Irving Erlichman
BY
Morse & Altman
ATTORNEYS

Oct. 5, 1965  I. ERLICHMAN  3,209,885
COIN RECEIVING AND RECORDING RECEPTACLE
Filed Feb. 12 1964  7 Sheets-Sheet 6

INVENTOR.
Irving Erlichman
BY
Morse & Altman
ATTORNEYS

Oct. 5, 1965 I. ERLICHMAN 3,209,885
COIN RECEIVING AND RECORDING RECEPTACLE
Filed Feb. 12 1964 7 Sheets-Sheet 7

INVENTOR.
BY Irving Erlichman
Morse & Altman
ATTORNEYS

United States Patent Office
3,209,885
Patented Oct. 5, 1965

3,209,885
COIN RECEIVING AND RECORDING
RECEPTACLE
Irving Erlichman, Natick, Mass., assignor to Advanced
Register, Inc., Framingham, Mass., a corporation of
Massachusetts
Filed Feb. 12, 1964, Ser. No. 344,287
15 Claims. (Cl. 194—102)

The present invention relates most generally to coin boxes that are used, for example, in connection with public conveyances, etc. to receive coins manually presented at random and that provide a record that represents the coins so received. The present invention relates more particularly to coin boxes of the foregoing type characterized by novel structure for advancing the coins in a positive manner, for sensing the coins so advanced, for recording the denominations of coins so sensed and for storing the coins so recorded.

The primary objects of the present invention involve the provision of a coin box of the foregoing type, in which: a rotatable disk and endless belt arrangement together serve to positively grip and advance coins introduced therebetween; a reciprocable sensing arrangement responds precisely to contact with coins advanced through the path defined by the disk and belt arrangement for producing initially an analog mechanical signal; a reciprocable arrangement of pins and apertures converts the analog mechanical signal to a electrical digital signal; a novel tamper-proof receptacle is detachable from the remainder of the receptacle under safety conditions; all of the primary operating components are readily observable through a window; and all of the foregoing features cooperate to perform a variety of functions in a versatile manner.

Other objects of the present invention will in part be obvious and will in part appear hereinafter.

The invention accordingly comprises the apparatus, its components and their interrelationships, which are explained in the following disclosure. For a fuller understanding of the nature and objects of the present invention, reference should be had to the following detailed description, taken in connection with the accompanying drawings, wherein:

*General description and the housing*

Figure 1:
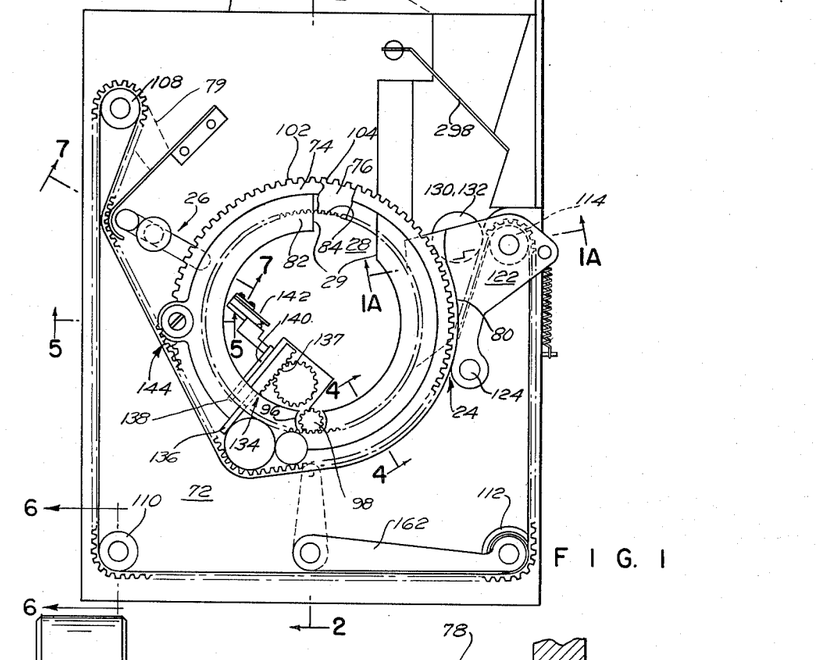
FIG. 1 is a plan view, directed obliquely toward the illustrated apparatus, the plan view being taken along the line 1—1 of FIG. 2.
Figure 2:
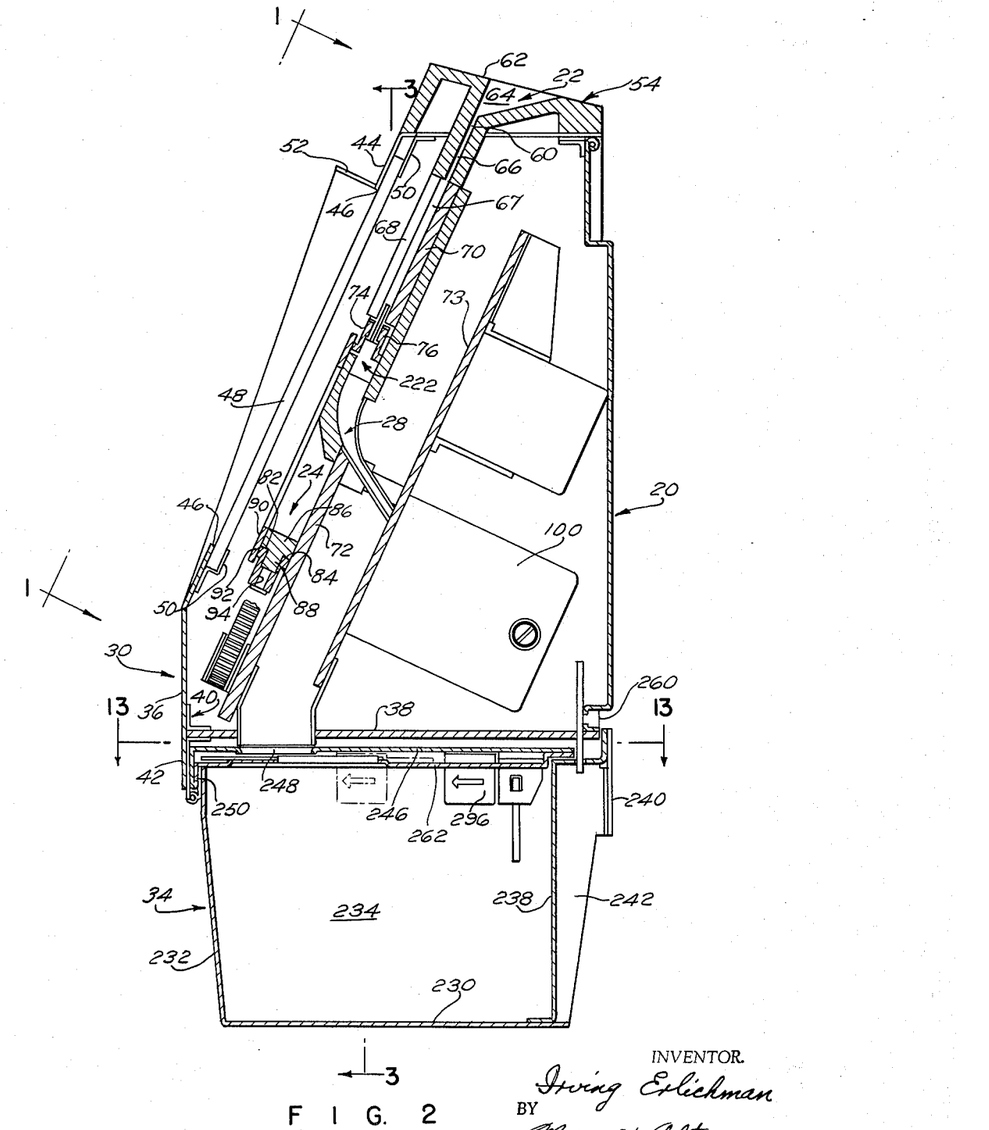
FIG. 2 is a cross-sectional view, partly broken away, of the apparatus of FIG. 1, the section being taken substantially along the line 2—2 of FIG. 1.

Generally, as shown in FIGS. 1 and 2, the operating components of the illustrated coin receptacle are enclosed within and mounted by a housing 20. These operating components include an entrance sub-assembly 22 for receiving a sequence of coins of random denomination, and advance sub-assembly 24 for separating coins of the sequence from each other and carrying them one-by-one through a predetermined path, a sensing sub-assembly 26 for gaging the diameters of the coins and recording the corresponding denominational values, a discharge sub-assembly 28 for receiving the sequence of coins from the sensing sub-assembly and a receptacable sub-assembly 30 for receiving the sequence of coins from the discharge assembly and storing the sequence of coins in damper-proof environment.

Figure 3:
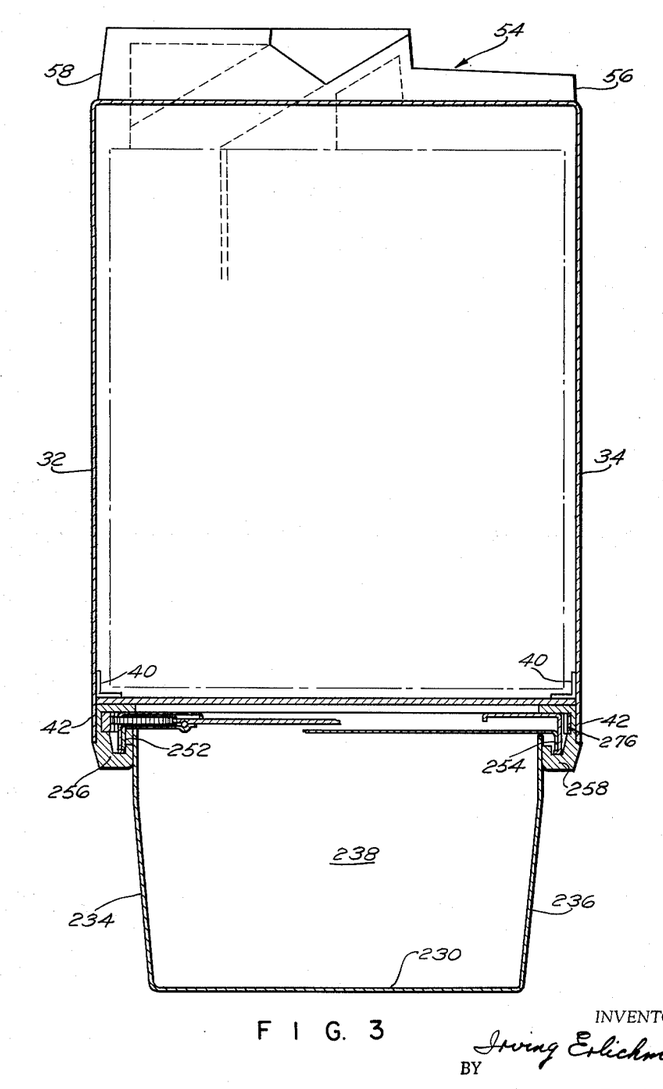
FIG. 3 is a cross-sectional view of the apparatus of FIGS. 1 and 2, the section being taken substantially along the line 3—3 of FIG. 2, omitting various operating components for the purpose of illustrating details of the housing.

Housing 20, with reference particularly to FIGS. 2 and 3, includes a shaped sheet metal frame having a pair of opposed side panels 32, 34 and a lower front panel 36, all perpendicular to a horizontal base panel 38. Base panel 38 is secured to side panels 32, 34 and front panel 36 by brackets 40 at a position spaced from the lower extremities of side panels 32, 34 and front panel 36 in order to leave an apron 42 peripherally depending from horizontal base panel 38. Obliquely sloping rearwardly from lower front panel 36 is a viewing face 44 that is provided with an opening 46. A transparent glass or plastic window 48 is positioned at opening 46 by suitable brackets 50, which are affixed to face 44 as by welding. A visor 52 extends along the sides and upper edge of opening 46 in order to obscure glare from window 48. The sequence of coin handling operations is effected by entrance subassembly 22, advance subassembly 24, sensing subassembly 26 and discharge subassembly 28, all of which are at least partly visible through window 48.

*The entrance subassembly*

Entrance subassembly 22 includes a molded plastic shape 54 that is affixed to the upper edges of side panels 32, 34 and viewing face 44. Molded plastic shape 54 provides side faces 56, 58 in the planes of side panels 32, 34, and a rearwardly slanting front face 60 in the plane of viewing face 44. The upper edges of molded plastic shape 54 define a rearwardly sloping plane 62 at the center of which is a chute 64. Chute 64 communicates with a narrow passage 66 that continues into a planar region 67, parallel to window 48. Planar region 67 continues from molded plastic shape 54 between a forward transparent glass or plastic wall 68 and a rearward metallic wall 70. Walls 68, 70, as well as other operating components now to be described in detail, are carried by a support plate 72, the side edges of which are affixed to side panels 32, 34 by suitable brackets (not shown).

*The advance sub-assembly*

Figures 5, 6:
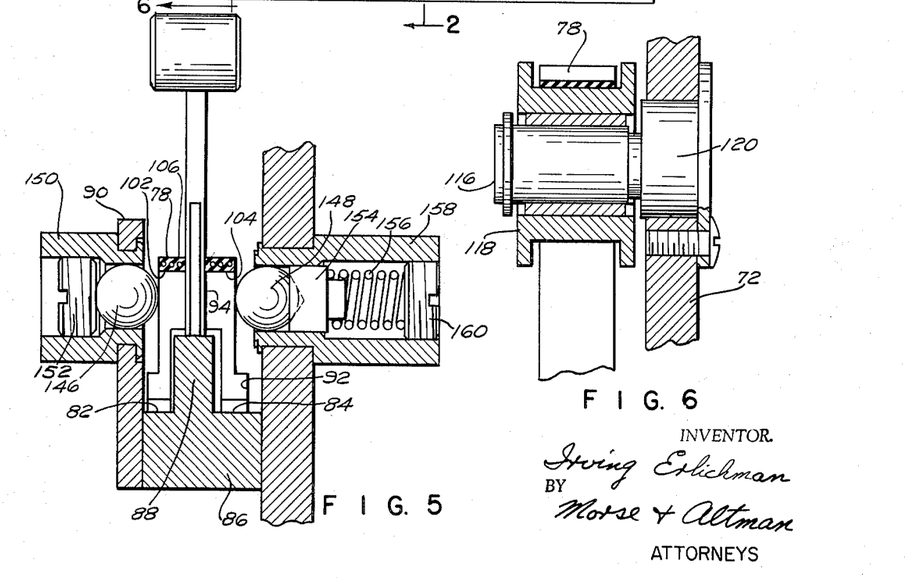
FIG. 5 is a detail sectional view, partly broken away, of certain components illustrated in FIG. 1, the section being taken substantially along the line 5—5 of FIG. 1.
FIG. 6 is a detail sectional view, partly broken away, of certain components illustrated in FIG. 1, the section being taken substantially along the line 6—6 of FIG. 1.

Advance sub-assembly 24, as shown in FIGS. 1, 2, 4, 5 and 6, generally includes a pair of flexible superposed disk rings 74, 76 for gripping advancing coins therebetween, and flexible endless belt 78, which engages disks 74, 76 along a substantial arc. Disk rings 74, 76 and belt 78 define a wedging mouth 80 by which advancing coins are forced into a frictional grip between disk rings 74, 76. Disk rings 74, 76 are mounted for rotation about central openings 82, 84, which are convoluted with internal gear teeth. These internal gear teeth rotatably bear on an annular guide 86, which is affixed to support plate 72. Disk rings 74, 76 are spaced from each other by an annular rib 88 that extends outwardly from annular guide 84 and are retained together by an annular shoulder 90 that is affixed to annular guide 86. Each of disk rings 74, 76 has an outwardly directed peripheral shoulder 92 and an inwardly directed peripheral shoulder 94. The relative positions of disk rings 74, 76 are maintained by peripheral shoulders 92, 92 which are held between annular rib 88 and associated portions of support plate 72 and annular shoulder 90. In consequence shoulders 94, 94 provide properly spaced retaining surfaces by which they are capable of pinching a sequence of coins therebetween. Annular guide 86 is cut away at 96 to accommodate a drive pinion 98, which meshes with the toothed inner internal peripheries 82, 84 of disk rings 74, 76. Drive pinion 98 is journaled in support plate 72 and is driven by a motor 100. The external peripheries 102, 104 of disk rings 74, 76 are convoluted with external gear teeth in such a way as to mesh with corresponding outwardly projecting gear teeth on endless flexible belt 78. Flexible endless belt 78 is composed of rubber having therein and therealong a plurality of endless steel cables 106 as is best shown in FIG. 5. Endless belt 78 rides on rolls 108, 110, 112 and 114, the details of one of which is shown in FIG. 6.

Each roller includes the inner face 116 and an outer face 118 between which are sleeve bearings. Inner face 116 is retained in position on support plate 72 by a suitable fastening arrangement 120. Roller 114 is journaled upon a pivoted guide 122, which moves about a center 120. Guide 122 is shown as having a pair of opposed walls 126, 128, of which a pair of opposed extensions 130, 132 project into position between disk rings 74, 76 in such a way as to ensure that entering coins are directed into position between the disk rings 74, 76. Approximately midway in the path of travel defined by disk rings 74, 76 is a coin stop mechanism 134 which prevents two or more coins from advancing through sensing assembly 26 before its cycle is completed. Coin stop mechanism 134 includes a solenoid actuated pin 136, the position of which is controlled by a rack-pinion arrangement 137. The pinion of arrangement 137 is controlled between actuated and deactuated condition by the solenoid. Stop pin 136 is controlled by a trigger finger 138, pivoted at 140, in order to actuate a switch 142 when the trigger is engaged by an advancing coin. This advancing coin thereby continues to advance while any following coins are blocked by stop pin 136. When the timing cycle initiated by trigger finger 138 and switch 142 is completed, stop pin 136 is retracted in order to permit the next coin to engage trigger finger 138 for the initiation for the next sensing cycle.

Just before an advancing coin enters sensing sub-assembly 26, it passes through a position 144 at which disk rings 74, 76 are compressed in order to grip the coin in such a way as to ensure proper actuation of advancing sub-assembly 26 as shown in FIG. 5. The compression is effected by a pair of opposed ball bearings 146, 148, of which ball bearing 146 is held in position by a suitable receptacle 150. An adjustable screw 152 is turned into receptacle 150, which is internally threaded. On the other hand, ball 148 is spring pressed toward ball 146 by a suitable anvil 154 that is biased by a helical compression spring 156 within a receptacle 158 under the adjustment of a screw 160, turned into the receptacle which is internally threaded. As shown, roll 112 is carried on a spring biased crank 162 in order to maintain the tautness of belt 78.

*The sensing sub-assembly*

Figures 1A, 4, 9, 16:
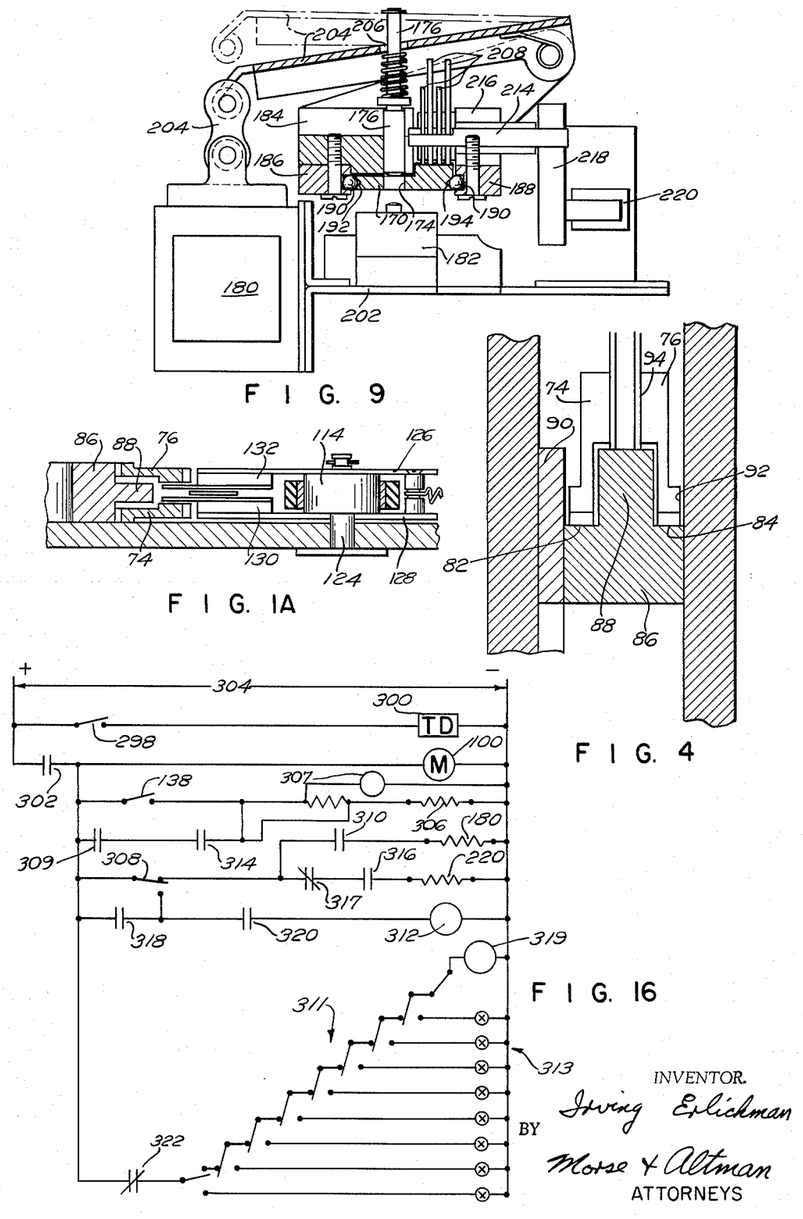
FIG. 1A is a detail sectional view, partly broken away, of certain components illustrated in FIG. 1, the section being taken substantially along the line 1A—1A of FIG. 1.
FIG. 4 is a detail view of certain of the components illustrated in FIG. 1, the section being taken substantially along the line 4—4.
FIG. 9 is a sub-assembly view, partly in cross-section and partly broken-away, of certain of the components of the apparatus of FIGS. 1 and 2.
FIG. 16 is an electrical schematic diagram of the control circuit of the apparatus of FIGS. 1 to 15.
Figure 7:
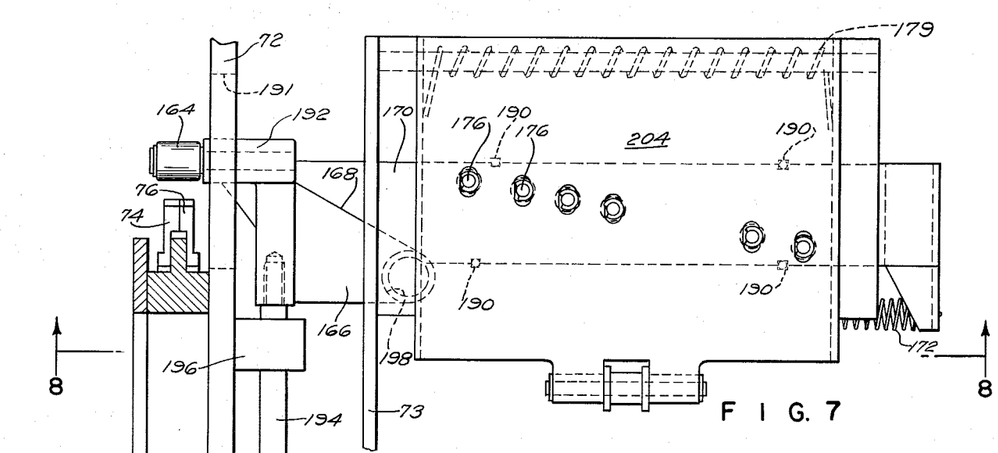
FIG. 7 is a sub-assembly view, partly in cross-section and partly broken-away, of certain of the components illustrated in FIGS. 1 and 2.
Figure 8:
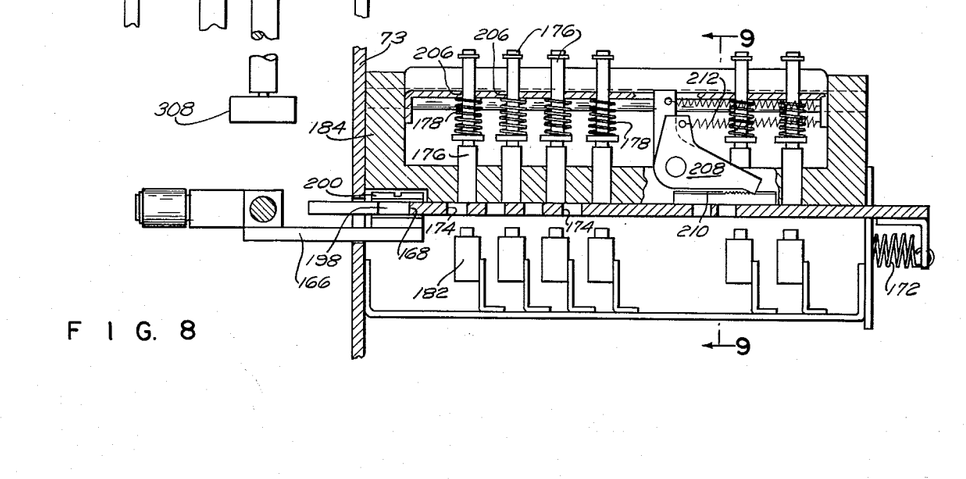
FIG. 8 is a sectional view of FIG. 7, the section being taken substantially along the line 8—8 of FIG. 7.

Sensing sub-assembly 26 is shown in detail in FIGS. 7, 8 and 9. Generally the cycle of sensing sub-assembly 26 is initiated when a coin, carried between disk rings 74, 76, engages a sensing roller 164. In this event, a wedge shaped arm 166 is urged outwardly with respect to disk ring 74, 76 in such a way as to carry therewith a follower roller 198. Follower roller 198 bears, as at 168, against an associated wedge profile of a slide 170, which is movable against spring bias 172 in a direction at right angles to the direction of movement of wedge shaped arm 166. Slide 170 is provided with an obliquely extending series of apertures 174. In association with apertures 174 is a series of reciprocable pins 176, which normally are urged into an upper position by a suitable torsion spring bias 178 but which are actuated into a position at which they may engage slide 170 under the control of a solenoid 180. The arrangement is such that for any of a selected series of positions assumed by slide 170, only one of pins 176 is capable of entering one of apertures 174. That pin so entering that aperture actuates one of a series of switches 182 as an indication of the denomination of the particular coin sensed by sensing roller 164.

The detailed interconnections of the foregoing components are as follows. Most of the components are mounted on a bracket 184 which is affixed to support plate 73. Beneath bracket 184 and affixed thereto are a pair of guide rails 186, 188, which are provided at their adjacent edges with ball bearings 190. These ball bearings ride in a pair of V-grooves 192, 194 at longitudinal edges of slide 170. Sensing roller 164 is connected to wedge shaped arm 166 through a slot 191 in support plate 72 by a transversely extending portion of a casting 192. Casting 192 is mounted for reciprocable movement on a rod 194 which slides within suitable bushings, one of which is shown at 196. Follower roller 198 is retained in position by a shouldered head 200. Switches 182 and solenoid 180 are affixed to support plate 73 by suitable brackets 202, solenoid 180 being connected to pins 176 by a linking plate 204. Linking plate 204 is provided with openings 206 through which pins 176 project and against which springs 178 abut. In the deactuated, most outward condition of solenoid 180, linking plate 204, which is pivotal and slidable with respect to pins 176, causes pins 176 to be withdrawn from slide 170 with springs 178 in uncompressed condition. In the actuated, most inward condition of solenoid 180, linking plate 204, its rotation limited by a suitable stop link, bears against springs 178 which in turn urge pins 176 toward slide 170.

In order to hold slide 170 in its maximum travelled position, a series of pawls 208, are meshed with a ratchet 210 along the surface of slide 170. Pawls 208 are biased toward ratchet 210 by suitable tension springs 212. Pawls 208 are released from ratchet 210 by a suitable shaft support 214 that is journaled as at 216 and rotated via a crank 218 by a solenoid 220. The operation of this assembly is such as to commence when an advancing coin contacts roller 164. Link 204 thereby is actuated to preload pins 176, which are spaced conveniently apart and at an axial angle from the first pin to the last pin in order to prevent any one pin from falling into the wrong aperture after plate 170 has moved into position determined by the diameter of a sensed coin. In other words, as the coin advances, wedge shaped arm 166, acting through guide roll 198, bears against wedge profile 168 in order to move slide 170 a predetermined distance that is a function of the diameter of the coin. Once the slide has stopped, solenoid 180 is energized to actuate linking plate 204. In consequence, the proper pin projects through the proper aperture, thereby tripping a normally open switch 182 which in turn energizes a pulsing device. At the end of the pulsing cycle, solenoid 180 is deenergized, allowing springs 178 and 179 to force linking plate 204 into de-actuated position. In practice the pins and holes have a vernier effect, acceptable accuracy of which is easily obtained. For example, without any motion magnification: a 0.5000 inch pin will not fit into a 0.4999 inch hole; but a 0.9999 inch pin will slide easily into a 0.5000 hole.

The discharge subassembly

Figures 10, 11, 12:
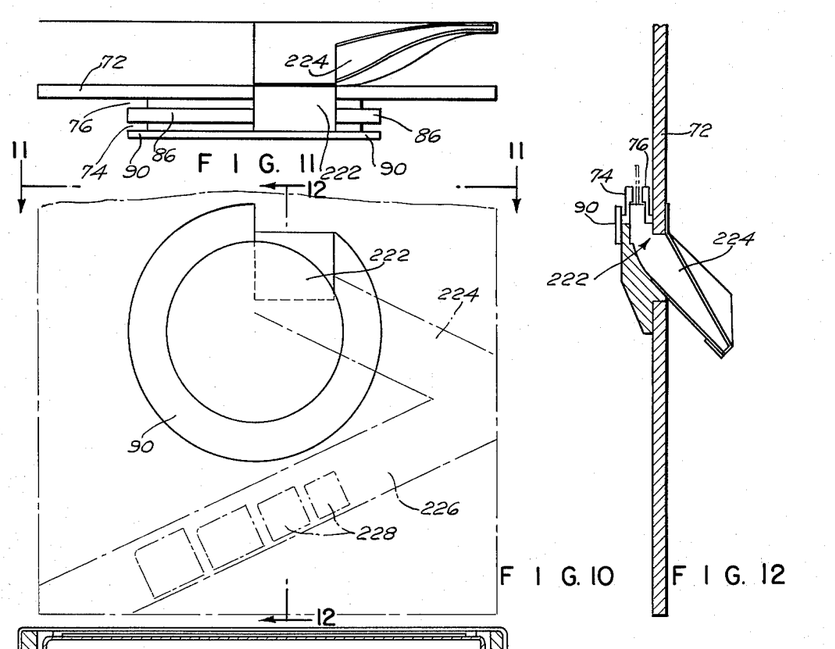
FIG. 10 is a front detail view of a component of the apparatus of FIGS. 1 and 2, hidden parts being shown in dotted lines.
FIG. 11 is a top plan view of the component of FIG. 10, the view being taken out substantially along the line 11—11 of FIG. 10.
FIG. 12 is a side elevation view of the component of FIG. 12, the view being taken substantially along the line 12—12 of FIG. 10.

Discharge sub-assembly 28 is shown in detail in FIGS. 2, 10, 11 and 12, with brief reference to FIG. 1. After a coin has been carried through sensing sub-assembly 26 between the gripping faces of disk rings 74, 76, it is carried to discharge subassembly 28, the opening to which is shown at 29 in FIG. 1. At this point, disk rings 74, 76 are forced open by a wedge 222, which is shown in relation to the remainder of the apparatus in FIG. 2. Wedge 222 is provided with an opening in a position between disk rings 74, 76. The positions of disk rings 74, 76 are suggested but not shown in FIG. 11. Also shown in FIG. 11 are retaining ring 90 and annular guide 86, which together maintain disk rings 74, 76 in proper relation. Support plate 72 is shown as having therethrough a chute 224 through which coins are dropped from between disk rings 74, 76 when released by spacer 222. This chute directs coins into an oblique guide 226, which is provided with a series of openings 228. These openings serve as a sorter through which coins of increasingly larger diameter drop. From openings 228, these coins are directed through channels (not shown) into a coin changer (not shown) or receptacle subassembly 30 now to be described.

The receptacle subassembly

Receptacle subassembly 30 is shown in detail in FIGS. 2, 3, 13, 14 and 15. When using subassembly 30, chute 226 need not have openings 228 but rather need have only one opening to accept all coins, which fall at random into the receptacle. As will be observed in FIGS. 2 and 3, receptacle 34 is in the form of a sheet metal box having a lower panel 230, a front panel 232, a pair of side panels 234, 236, a rearward panel 238 and a rearwardly set-off grip panel 240. The edges of grip panel 240 are secured to extensions 242, 244 of side panels 234, 236. The top panel of receptacle 34 is shown at 246 as being provided with an opening 248 for the reception of coins when the receptacle is in proper alignment with the remainder of the apparatus. Top panel 246 is shaped to provide a front depending rail portion 250 and a pair of side depending rail portions 252, 254. These rail portions ride on a pair of hook arrangements 256, 258, which depend from opposite sides of the apparatus, namely from side panels 32, 34 of housing 20. It will be apparent that receptacle 34 may be withdrawn from and connected to the remainder of the apparatus from the rear of the housing. A suitable lock arrangement 260 is provided to lock the receptacle 30 in position or to release it for withdrawal in an operator's discretion. A tamper proof closure for opening 248 is provided immediately beneath cover panel 246 for automatic operation in such a way as to open automatically when closure 34 is inserted into position and to close automatically when receptacle 34 is removed from position within the remainder of the apparatus. The components of this automatic arrangement are journaled or slidable between top panel 246 and an auxiliary panel 262.

Figure 13:
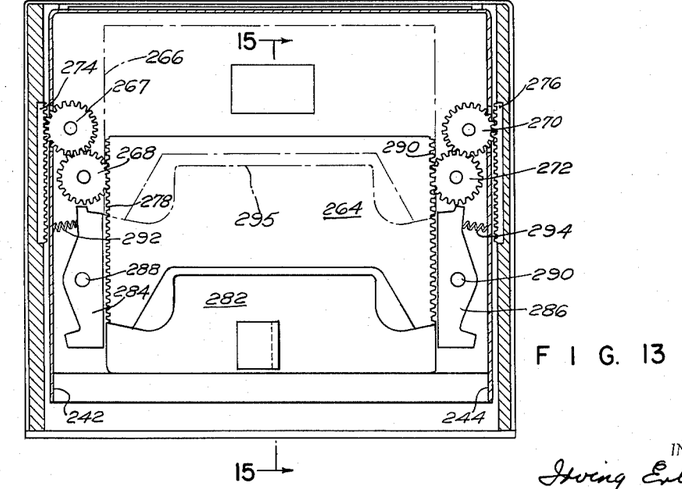
FIG. 13 is a cross-sectional view taken substantially along the line 13—13 of FIG. 2.
Figure 14:
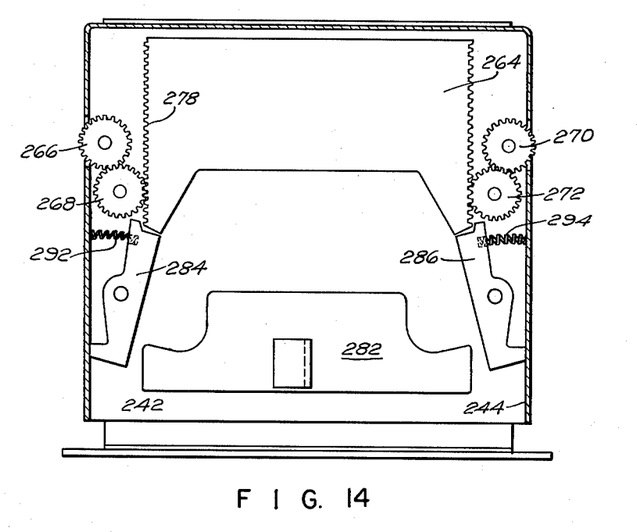
FIG. 14 is a view, analogous to the view of FIG. 13, illustrating certain components of the apparatus of FIGS. 1 and 2 in alternative position.
Figure 15:
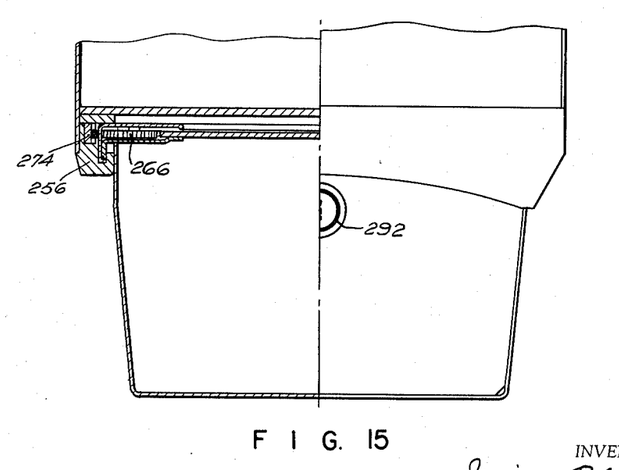
FIG. 15 is a cross-sectional view taken substantially along the line 15—15 of FIG. 13.

These components include a slidable shutter 264 that is shown in FIG. 13 as uncovering opening 248 for the reception of coins. This shutter is shown at 266 in dotted lines as being in closed position, at which opening 248 is covered. In order to cause shutter 264 to open automatically when receptacle 34 is inserted into the remainder of the apparatus and to open automatically when receptacle 34 is removed from the remainder of the apparatus the following associated components are provided. At opposite edges of top panel 246 are opposed pairs of gears 267, 268, 270 and 272. Gears 267 and 270 mesh with racks 274, 276 which are affixed to hook arrangements 256, 254, as shown in FIG. 15. Assuming shutter 264 to be in closed position 266 initially, insertion of receptacle 34 into connection with the remainder of the apparatus, causes gears 267, 270 to engage racks 274, 276 whereby gears 268, 272, which mesh with a pair of racks 278, 290 at the side edges of shutter 264, thereby causes shutter 264 to slide open rendering opening 248 accessible. As shutter 264 slides open, it moves with it a slidable cam plate 282, the purpose of which will become apparent. When receptacle 34 is removed, shutter 264 moves to closed position below opening 248 by virtue of the rotation of gears 266, 268 and 270, 272. Cam plate 282, which is composed of a light plastic sheet material that frictionally engages the inner surfaces of upper panel 246 and auxiliary panel 262, however, remains in its rearwardmost position. In consequence, a pair of opposed latch plates 284, 286, which are pivoted at 288, 290 and spring pressed at 292, 294, pivot inwardly as indicated in FIG. 14 thereby locking shutter 264 in closed position. Thereafter, shutter 264 cannot be opened until following the unclocking at 292 of a trap door hinged to front panel 232. When this trap door is opened, cam plate 282 is moved manually into its most forward position as at 295 in order to release latch plates 284, 286. Cam plate 282 may be moved into this forward most position by manual engagement of a depending lug 96. At this time the receptacle 34 is reset and adapted for reinsertion in and connection with the remainder of the apparatus.

Schematic electrical diagram and operation

The overall operation of the illustrated embodiment of the present invention now will be described in connection with the schematic electrical diagram of FIG. 16. When a coin is dropped into entrance subassembly 22, it engages a start switch 298, shown mechanically in FIG. 1. Start switch 298 is in series with a time delay relay 300, which permits contact points 302 to apply power from a suitable supply 304 for a short predetermined period, for example, three seconds. Thus, if within three seconds after the entrance of the first coin, a second coin is not dropped into entrance 22, the operation of the apparatus stops. The closing of contacts 302 energizes motor 100, shown mechanically in FIG. 2, by which rotation of disk rings 74, 76 occurs in connection with advancement of belt 78. Advancement of belt 78 is ensued by a drive belt 79 which is driven by pinion shaft 98. The coin is advanced into frictional contact between disk rings 74, 76 with its outer periphery in contact with belt 78. As the coin advances into coin stop mechanism 134, it contacts switch 138, 142 by which a solenoid 306 causes rotation and engagement of pinion and rack 137 and projection of stop pin 136. A second coin thereby is prevented from advancing while the first coin continues to advance. When the coin engages sensing roll 164, double pole single throw switch 308 is actuated in order to energize four-pole, double throw relay 312. Contact 318 closes so as to hold relay 312 energized. Relay 319 (normally energized) is in series with switches 182. Contact 320 of relay 319 is closed, thereby allowing relay 312 to remain energized. When the sensing roll returns to its rest position, solenoid 180 is energized as contact 310 (normally open) remains closed when relay 312 is energized. When solenoid 180 is energized, selected pin 176 projects through selected aperture 174 in order to actuate a selected switch 182. Switch 182 in turn energizes a counter and breaks the circuit of relay 319. When relay 319 is deenergized, contact 320 opens, deenergizing relay 312. When relay 312 is deenergized, contact 310 is opened, deenergizing solenoid 180. Switch 316 closes energizing solenoid 220 so as to release pawls 208, allowing slide 170 to return to rest position. In the event of advancement of an improper coin (i.e. a misshaped coin, a false slug, etc.) through the gaging station, a switch 322 opens in order to release pawls 208 and enabling the return of slide 170 to rest position. Also contact 314 opens in order to deenergize solenoid 306 and to allow pin 136 to retract. Another coin now is permitted to enter the gaging station, the cycle thereby being repeated.

The present invention thus provides a coin receiving and recording apparatus characterized by the reliability of position coin advancement under rugged circumstances by virtue of unprecedently simple arrangement of a relatively few components. Since certain changes may be made in the foregoing disclosure without departing from the scope of the present invention, it is intended that all matters described in the foregoing specification and shown in the accompanying drawings be interpreted in an illustrative and not in a limiting sense.

What is claimed is:

1. A coin receiving apparatus comprising advance means for directing coins through a predetermined path, said path being disposed substantially in a plane, said advance means including disk means journaled in said apparatus for rotation about an axis perpendicular to said plane and providing coin edge contacting areas and coin face contacting areas defining said path in part, said coin edge contacting areas of said disk means being disposed in an inner arc, said advance means including resilient belt means constrained in said apparatus for advancement substantially in said plane and providing coin edge contacting areas defining said path in part, said coin edge contacting areas of said belt means being disposed in an outer arc, said coin face contacting areas being disposed between said inner arc and said outer arc, whereby a coin may be advanced through said path while being substantially disposed in said plane, sensing means for determining the identity of coins advanced through said path, and stop means adjacent to said path for interrupting the advancement of additional coins when a first coin is being sensed by said sensing means.

2. The apparatus of claim 1 wherein said disk means and said belt means are driven together.

3. The apparatus of claim 1 wherein said belt means is endless.

4. The apparatus of claim 1 wherein said disk means present endless disk rings.

5. A receiving and recording apparatus comprising advance means for directing coins through a predetermined path, said advance means including a pair of flexible rotatable elements presenting adjacent surfaces and a belt engaging said rotatable elements, said path being defined by said adjacent surfaces and said belt in such a way that said coins during advancement are forced by said belt into frictional engagement with said adjacent surfaces, a sensing means, said sensing means including a reciprocable pin in adjacence with said path, a reciprocable cam means driven by said pin, a reciprocable slide driven by said cam means, and means for translating motion of said slide into an indication of the coin in said path, said reciprocable pin being biased into said path in order to successively contact coins successively advanced through said path, whereby the motion of said slide is a function of the diameter of a coin in contact with said reciprocable pin.

6. A coin receiving and recording apparatus comprising entrance means for the reception of a random sequence of coins, advance means for directing said coins through a predetermined path, sensing means for engaging said coins when in said predetermined path in order to gage their diameters, discharge means for removing said coins from said predetermined path and receptacle means for receiving said coins from said discharge means, said entrance means providing a slot through which said coins are directed to said path, said advance means including a pair of flexible rotatable elements presenting adjacent surfaces and an endless belt engaging said rotatable elements, said path being defined at least by said adjacent surfaces and said belt in such a way that said coins are forced by said belt into frictional engagement with said adjacent surfaces, said sensing means including a reciprocable engaging pin in adjacence with said path, a reciprocable cam means driven by said engaging pin, a reciprocable slide driven by said cam means, said slide having a plurality of predeterminedly spaced holes therein, and a plurality of associated pins, certain of said associated pins being capable of penetrating certain of said associated holes when said reciprocable slide is in a preselected position in order to indicate the denomination of a coin engaged by said engaging pin.

7. The apparatus of claim 5 wherein said belt presents teeth and said rotatable elements present teeth, said first mentioned teeth and said second mentioned teeth meshing.

8. A coin receiving and recording apparatus comprising entrance means for the reception of a random sequence of coins, advance means for directing said coins through a predetermined path, sensing means for engaging said coins when in said predetermined path in order to gage their diameters, discharge means for removing said coins from said predetermined path and receptacle means for receiving said coins from said discharge means, said entrance means providing a slot through which said coins are directed to said path, said advance means including a pair of flexible rotatable elements presenting adjacent surfaces and an endless belt engaging said rotatable elements, said path being defined at least by said adjacent surfaces and said belt in such a way that said coins are forced by said belt into frictional engagement with said adjacent surfaces, said sensing means including a reciprocable engaging pin in adjacence with said path, a reciprocable cam means driven by said engaging pin, a reciprocable slide driven by said cam means, said slide having a plurality of predeterminedly spaced holes therein, and a plurality of associated pins, certain of said associated pins being capable of penetrating certain of said associated holes when said reciprocable slide is in a preselected position in order to indicate the denomination of a coin engaged by said engaging pin, said discharge means including a cam for separating said adjacent surfaces of said rotatable elements and providing an opening for coins freed therefrom.

9. A coin receiving and recording apparatus comprising entrance means for the reception of a random sequence of coins, advance means for directing said coins through a predetermined path, sensing means for engaging said coins when in said predetermined path in order to gage their diameters, discharge means for removing said coins from said predetermined path and receptacle means for receiving said coins from said discharge means, said entrance means providing a slot through which said coins are directed to said path, said advance means including a pair of flexible rotatable disk rings presenting adjacent surfaces and an endless belt, said disk rings being provided with peripheral teeth, said endless belt being provided with peripheral teeth, said first mentioned teeth and said second mentioned teeth meshing, said path being defined by said adjacent surfaces and said belt in such a way that said coins are forced by said belt into frictional engagement with said adjacent surfaces, said sensing means including a reciprocable engaging pin in adjacence with said path, a reciprocable cam means driven by en-gaging pin, a reciprocable slide driven by said cam means, said slide having a plurality of predeterminedly spaced holes therein, and a plurality of associated pins, certain of said associated pins being capable of penetrating certain of said associated holes when said reciprocable slide is in a preselected position in order to indicate the denomination of a coin engaged by said engaging pin, said discharge means including a cam for separating said adjacent surfaces of said rotatable elements and providing an opening for coins freed therefrom.

10. The apparatus of claim 8 wherein said disk rings are cammed apart in the vicinity of said discharge means to permit release of coins held by said disk rings.

11. A coin receiving apparatus comprising advance means for directly coins through a predetermined path, said path being disposed substantially in a plane, said advance means including a pair of resilient gripping elements having centers that are journaled in said apparatus for rotation about an axis and peripheries that are curved, said resilient gripping elements presenting opposed gripping surfaces contiguously adjacent at their peripheries which gripping surfaces are substantially biased toward each other at said plane, said gripping elements providing shoulder means about said axis between said gripping surfaces and said axis, said gripping surfaces being disposed between said shoulder means and said peripheries, a resilient belt constrained in said apparatus for advancement in contiguity with said peripheries, and means for synchronizing said rotation of said resilient gripping elements about said axis and said advancement of said belt through said path, whereby a coin may be held between said gripping surfaces and between said shoulder means and said belt for advancement through said path.

12. The coin receiving apparatus of claim 11 wherein said peripheries are provided with gear teeth and said belt is provided with gear teeth, said gear teeth of said peripheries and said gear teeth of said belt meshing.

13. The coin receiving apparatus of claim 12 wherein said belt contains therealong and therewith elongated metal elements of high tensile strength.

14. A coin handling apparatus comprising inner means and outer means defining a path substantially in a plane about an axis substantially perpendicular to said plane, said inner means providing contiguously opposed surfaces extending along said path, said inner means providing an inner surface extending along said path between said path and said axis, said outer means providing an outer surface extending along said path so that said opposed surfaces are disposed between said inner surface and said outer surface, said contiguously opposed surfaces being for contacting the opposed faces of said coin and said inner surface and said outer surface being for contacting opposed edges of said coin, means for advancing said coin through said path, and means at said path for gaging the diameter of a coin advancing through said path.

15. The coin handling apparatus of claim 14 wherein said last mentioned means includes a rectilinearly reciprocable pin is biased in said apparatus into said path in order to gage the diameter of a coin advancing through said path.

References Cited by the Examiner

UNITED STATES PATENTS

| | | | |
|---|---|---|---|
| 1,512,515 | 10/24 | Woods | 232—7 |
| 2,016,268 | 10/35 | Griffith | 198—160 |
| 2,580,401 | 1/52 | Broussard | 232—7 |
| 2,594,422 | 4/52 | Gordon | 194—102 |
| 2,805,746 | 9/57 | Grant | 194—16 |
| 2,851,152 | 9/58 | Olsson | 198—193 |
| 3,155,101 | 11/64 | Perkins | 194—97 |

FOREIGN PATENTS 530,362  7/31  Germany.

SAMUEL F. COLEMAN, *Primary Examiner.*